United States Patent
Reynolds et al.

(10) Patent No.: US 9,933,906 B2
(45) Date of Patent: Apr. 3, 2018

(54) CAPACITIVE SENSING USING DISCRETE LIGHTING ELEMENTS

(71) Applicant: SYNAPTICS INCORPORATED, San Jose, CA (US)

(72) Inventors: Joseph Kurth Reynolds, San Jose, CA (US); Torbjorn Hovden, Santa Clara, CA (US); Mihai M. Bulea, Santa Clara, CA (US); Joel C. Jordan, Sunnyvale, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 5 days.

(21) Appl. No.: 15/083,192

(22) Filed: Mar. 28, 2016

(65) Prior Publication Data

US 2017/0277295 A1  Sep. 28, 2017

(51) Int. Cl.
G06F 3/044 (2006.01)
G06F 3/042 (2006.01)

(52) U.S. Cl.
CPC .............. G06F 3/044 (2013.01); G06F 3/042 (2013.01)

(58) Field of Classification Search
CPC ...... G06F 3/044; G06F 3/048; G06F 3/04883; G06F 3/041
See application file for complete search history.

(56) References Cited

U.S. PATENT DOCUMENTS

| | | | |
|---|---|---|---|
| 8,319,434 B2 | 11/2012 | Hente | |
| 8,466,590 B2 | 6/2013 | Hauser et al. | |
| 2004/0263483 A1 | 12/2004 | Aufderheide | |
| 2008/0036746 A1 | 2/2008 | Klinghult | |
| 2011/0080365 A1* | 4/2011 | Westerman | G06F 3/0418 345/173 |
| 2012/0162133 A1 | 6/2012 | Chen et al. | |
| 2012/0218199 A1 | 8/2012 | Kim et al. | |
| 2013/0215075 A1 | 8/2013 | Lee et al. | |
| 2013/0307820 A1 | 11/2013 | Kim | |
| 2013/0314343 A1 | 11/2013 | Cho et al. | |
| 2014/0021966 A1* | 1/2014 | Shahrokhi | G01R 27/2605 324/679 |
| 2016/0018867 A1* | 1/2016 | Nys | G01R 27/2605 324/674 |
| 2016/0291736 A1* | 10/2016 | Tamaki | G06F 3/044 |

* cited by examiner

*Primary Examiner* — Olga Merkoulova

(74) *Attorney, Agent, or Firm* — Patterson + Sheridan, LLP

(57) ABSTRACT

An example processing system for a capacitive input device includes a first interface coupled to at least one first electrode of at least one lighting element and a second interface coupled to at least one second electrode of the at least one lighting element spaced apart from the at least one first electrode. A controller is configured to: forward-bias the at least one lighting element during first time periods to provide illumination; drive the at least one first and the at least one second electrodes with substantially the same voltage during second time periods; and drive the at least one first electrode with a modulated voltage relative to a reference voltage while guarding the at least one second electrode during third time periods to measure capacitance. A determination module is configured to determine presence of at least one input object in a sensing region based on changes in the capacitance.

17 Claims, 5 Drawing Sheets

CAPACITIVE SENSING USING DISCRETE LIGHTING ELEMENTS

BACKGROUND

Field of the Disclosure

Embodiments of disclosure generally relate to integrated display and capacitive sensing devices and, more particularly, capacitive sensing using discrete lighting elements.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers) In other examples, proximity sensor devices are used in keyboards, buttons, and user interface elements configured to detect input (such as space bar keys, finger-print sensors and touchpad buttons integrated in a laptop c-cover or mobile phone bezel). Proximity sensor devices are also often used in smaller computing systems (such as touch screens integrated in cellular phones).

SUMMARY

Techniques for capacitive sensing using discrete lighting elements are described. In an embodiment, a processing system for a capacitive input device includes a first interface coupled to at least one first electrode of at least one lighting element and a second interface coupled to at least one second electrode of the at least one lighting element spaced apart from the at least one first electrode. The processing system further includes a controller, coupled to the first interface and the second interface, configured to: forward-bias the at least one lighting element during first time periods to provide illumination; drive the at least one first electrode and the at least one second electrode with substantially the same voltage during second time periods; and drive the at least one first electrode with a modulated voltage relative to a reference voltage while guarding the at least one second electrode during third time periods to measure capacitance. The processing system further includes a determination module, coupled to the controller, configured to determine presence of at least one input object in a sensing region based on changes in the capacitance to the at least one first electrode.

In another embodiment, a capacitive sensing system includes an input device including at least one lighting element having at least one first electrode spaced apart from at least one second electrode. The capacitive sensing system further includes a processing system having a first interface coupled to the at least one first electrode and a second interface coupled to the at least one second electrode. The processing system includes a controller, coupled to the first interface and the second interface, configured to: forward-bias the at least one lighting element during first time periods to provide illumination; drive the at least one first electrode and the at least one second electrode with substantially the same voltage during second time periods; and drive the at least one first electrode with a modulated voltage relative to a reference voltage while guarding the at least one second electrode during third time periods to measure capacitance. The processing system further includes a determination module, coupled to the controller, configured to determine presence of at least one input object in a sensing region based on changes in the capacitance to the at least one first electrode.

In another embodiment, a method of controlling at least one lighting element for illumination and capacitive sensing is described. The at least one lighting element comprises at least one first electrode spaced apart from at least one second electrode. The method includes forward-biasing the at least one lighting element during first time periods to provide illumination. The method further includes driving the at least one first electrode and the at least one second electrode with substantially the same voltage during second time periods. The method further includes driving the at least one first electrode with a modulated voltage relative to a reference voltage while guarding the at least one second electrode during third time periods to measure capacitance. The method further includes determining presence of at least one input object in a sensing region based on changes in the capacitance to the at least one first electrode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
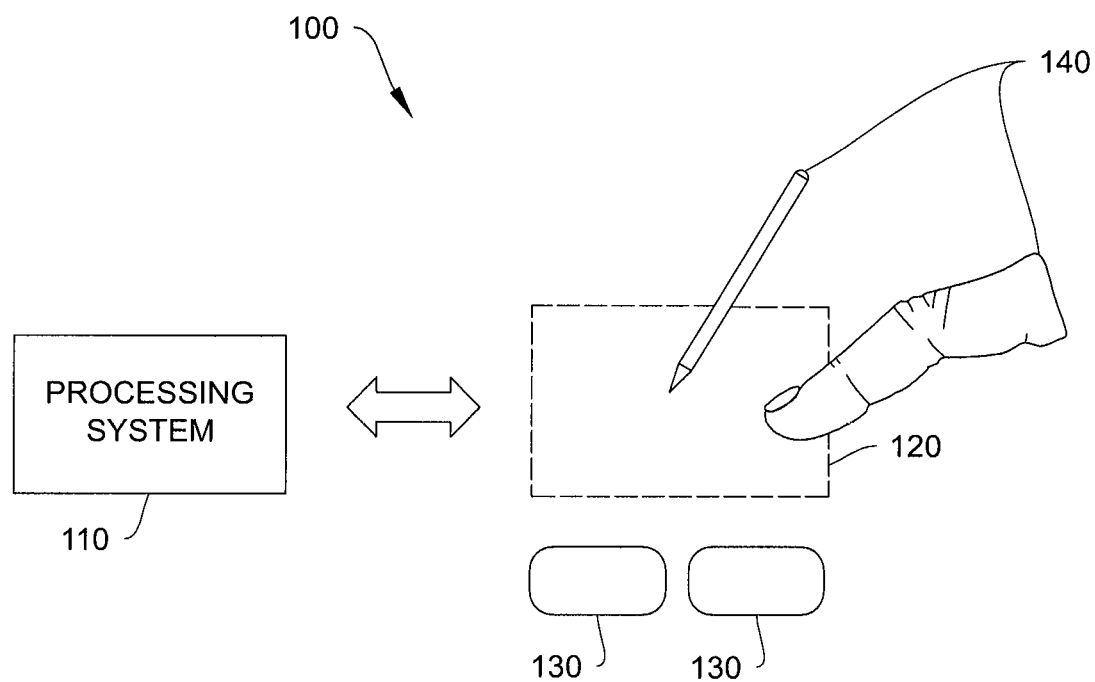
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). A resulting signal may also comprise effect(s) of an active pen (i.e. stylus) in the sensing region by, for example, holding the receiver electrode(s) stationary with respect to a system ground. Sensor electrodes may be dedicated transmitters or receivers, or may be configured to both transmit and receive. In some embodiments, resulting signals from both trans-capacitive and absolute capacitive measurements are used (e.g. combined) to determine moisture on the sensing surface and/or effects of low coupling of the device's system ground to a user.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). For example, the receiver circuitry may comprise charge to voltage converters, current conveyors, integrators and low pass filters, demodulators, ADCs and/or other necessary elements. Additionally, the transmitter circuitry may comprise modulators, switches, DACs, and/or other elements. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. Other operation modes include low power and test modes. In a low power mode touch sensing duty cycle(s) may be substantially reduced (e.g. shorter sensing period and longer time between sensing periods) to reduce power (e.g. 10× lower). In a test mode switches, DAC, and ADCs may be specially configured to measure open or short connections (e.g. to or between anodes and cathodes). In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
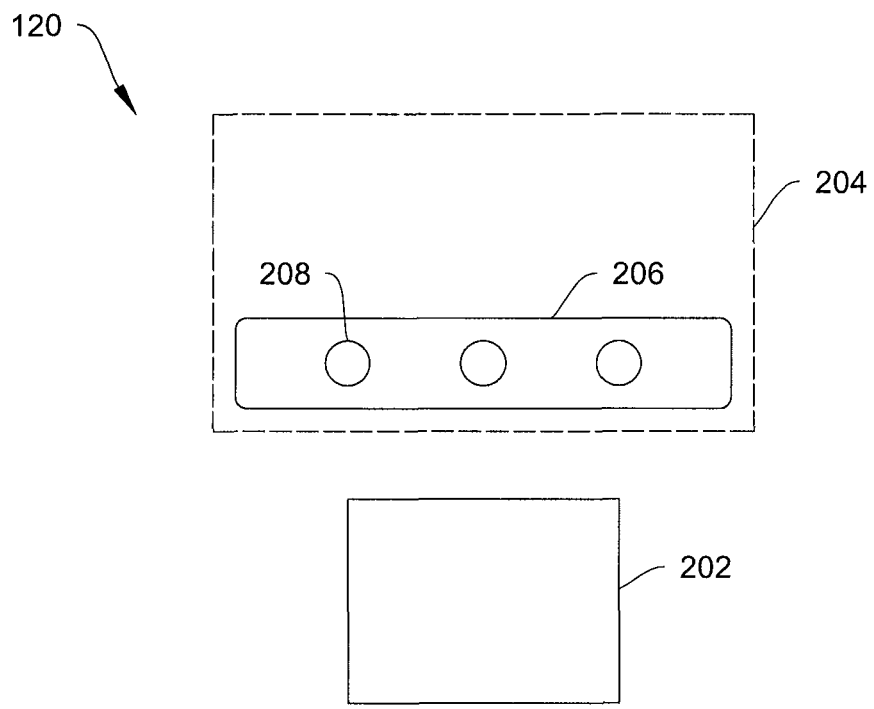
FIG. 2 is a block diagram depicting a portion of the input device of FIG. 1 within a sensing region according to an embodiment.
Figure 3:
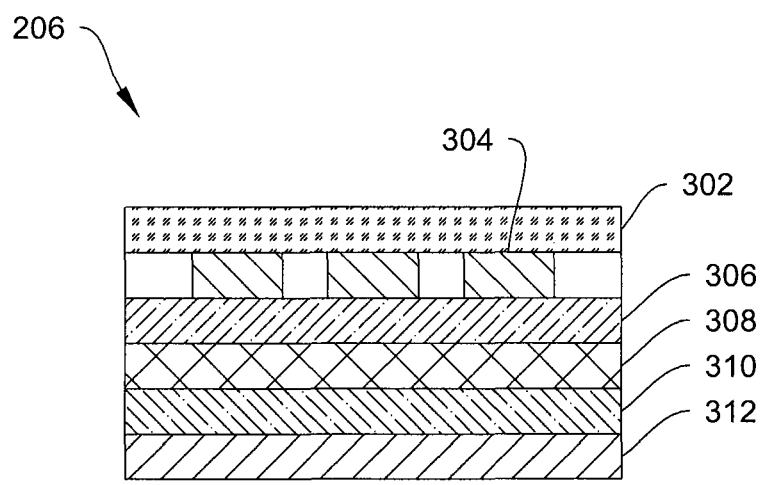
FIG. 3 is a diagram depicting a cross-section of a key of a keyboard having lighting elements according to an embodiment.

FIG. 2 is a block diagram depicting a portion of the input device 100 within the sensing region 120 according to an embodiment. In the embodiment of FIG. 2, the input device 100 includes a track pad 202 and a keyboard 204. The track pad 202 can be a capacitive sensing device for sensing the presence of input object(s). The keyboard 204 can include a plurality of keys. In the embodiment shown, the keyboard 204 includes a key 206. The key 206 includes at least one lighting element (e.g., a plurality of lighting elements 208) disposed therein. In an embodiment, the lighting elements 208 comprise organic light emitting diodes (OLEDs) or the like. In an embodiment, the key 206 is substantially wider than the other keys of the keyboard 204, such as at least two times wider than other keys of the keyboard 204 (e.g., a space bar). However the lighting elements and sensors may be spaced closely enough to fill a region of the key such that relative motion (e.g. scrolling) can be determined from at least one user input FIG. 3 is a diagram depicting a cross-section of the key 206 according to an embodiment. As shown in FIG. 3, the key 206 includes an input surface 302. The input surface 302 can be formed of a transparent or translucent material so that illumination of the lighting elements 208 can pass through the input surface 302. The key 206 further includes a substrate 306 having a first electrode (e.g. an anode or cathode of an LED) of each lighting element 208 formed thereon (e.g., first electrodes 304). The key 206 further includes a substrate 312 having a second electrode of each lighting element 208 formed thereon (e.g., second electrode 310). In the example shown, the second electrode 310 is a common electrode shared by all of the lighting elements 208 (e.g. an anode or cathode of an LED). In other examples, each lighting element 208 can include an individual second electrode 310. In still other examples, groups of lighting elements 208 can share individual second electrodes 310. In any of the embodiments above, the first lighting element is an anode or cathode of an LED and the second lighting element is an anode or cathode of an LED.

The key 206 further includes light emission material 308 disposed between the substrates 306 and 312. In an embodiment, the lighting elements 208 comprises OLEDs and the light emission material 308 can include, for example, an emitting layer, an electron transport layer, and a hole transport layer. The light emission material 308 can include other materials/layers depending on the type of the lighting elements 208. In the embodiment shown, the first electrodes 304 are disposed on top of the substrate 306 facing the input surface 302. In other embodiments, the first electrodes 304 can be disposed on a bottom surface of the substrate 306 facing the light emission material 308. The first electrodes 304 can be formed of a transparent conductive material so that the light emitted from the light emission material 308 can pass through the first electrodes 304. In some embodiments, an encapsulation layer may be used over the surface of the surface of the supporting substrate and electrodes that encapsulate the OLED material and associated electrodes. This encapsulation may extend beyond the edge of the lighting elements.

In an embodiment, the first electrodes 304 comprise anode electrodes and the second electrode 310 comprises a cathode electrode for the lighting elements 208. In another embodiment, the first electrodes 204 comprise cathode electrodes and the second electrode 310 comprises an anode electrode for the lighting elements 208. In some embodiments, the electrodes may be composed of multiple layers, for example the an anode/cathode in contact with an OLED layer may be a stack of a transparent electrode (e.g. ITO, PEDOT-PSS) and an electron/hole carrier layer while the other may be an opaque conductor (e.g. aluminum/gold/silver or carbon ink). In other applications a hetero junction can be formed. In general, the at least one lighting element 208 includes at least one first electrode 304 spaced apart from at least one second electrode 310. In an embodiment, the substrate 306, the substrate 312, or both comprise flexible substrates. In an embodiment, the substrate 306 and/or the substrate 312 comprise flexible substrates that conform to a profile of the input surface 302. By way of example, the input surface 302 is shown as having a flat profile. However, in other embodiments, the input surface 302 can have a differently shaped profile, such as a curved profile and the substrate 306 and/or the substrate 312 conform to the curved profile of the input surface 302, or be flexible or repeatedly bendable.

In the embodiments described above, the lighting elements 208 are embedded in a key 206 of a keyboard 204. As described further below, the lighting elements 208 are coupled to the processing system 110 and are used for both illumination and capacitive sensing of input object(s). Those skilled in the art will appreciate that the processing system 110 can be coupled to lighting elements in other contexts in addition to the lighting elements 208 in the key 206. For example, the processing system 110 can be coupled to lighting elements disposed beneath an input surface adjacent to a display. In general, as described further herein, the processing system 110 can be coupled to lighting elements and can utilize electrodes thereof for capacitive sensing.

Figure 4:
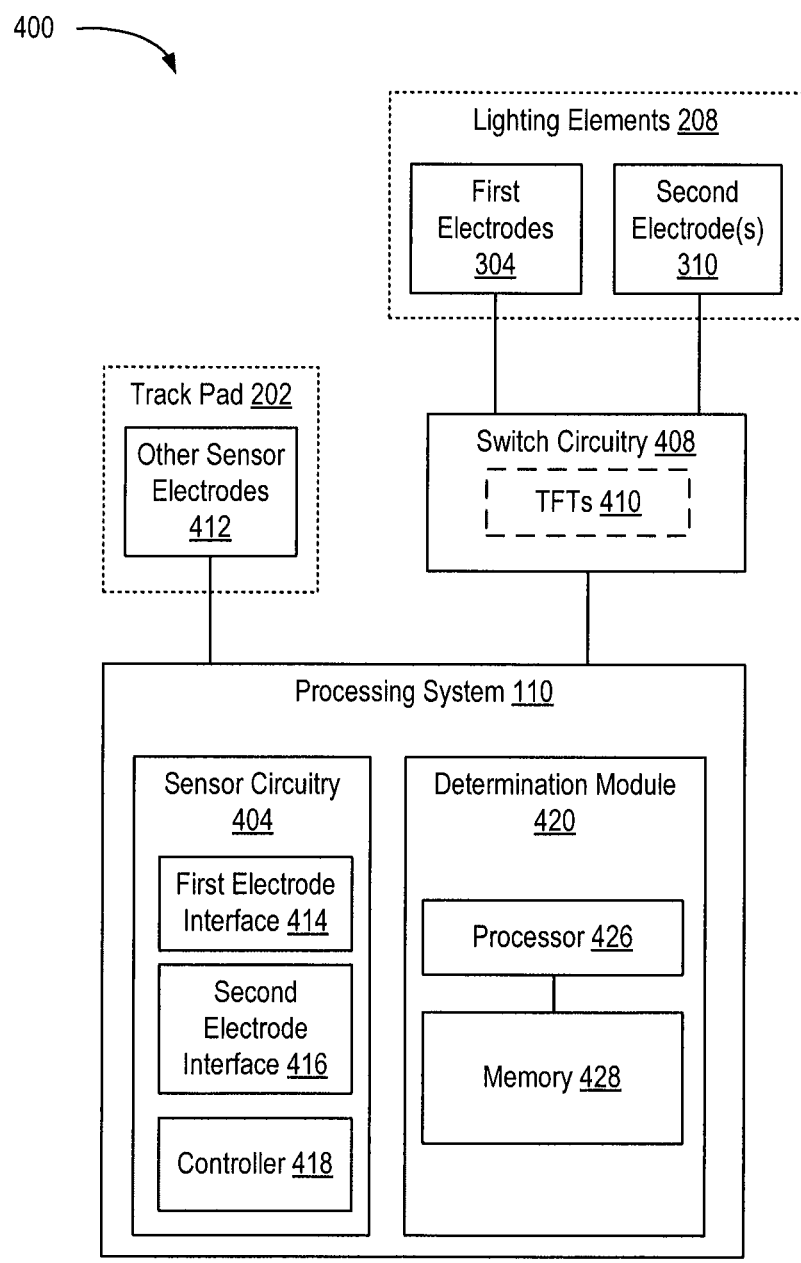
FIG. 4 is a block diagram depicting a capacitive sensing system according to an embodiment.

FIG. 4 is a block diagram depicting a capacitive sensing system 400 according to an embodiment. The capacitive sensing system 400 includes the processing system 110 and the lighting elements 208. The lighting elements 208 include the first electrodes 304 (e.g., anodes) and the second electrode(s) 310 (e.g., cathode(s)). In an embodiment, the processing system 110 is coupled to the first electrodes 304 and the second electrode(s) 310 through switch circuitry 408. In one embodiment, at least the first and second electrode are connected to a second ASIC through ACF bonds to a flexible substrate. That ASIC may be further connected to other (e.g. SMT) components or connectors to generate reference voltages or communicate touch (e.g. input position) or lighting condition (e.g., unlit, dim or bright). In another embodiment, the processing system 110 can include switch circuitry embedded therein and can be directly coupled to the first electrodes 304 and the second electrode(s) 310. In some embodiments, the switch circuitry 408 includes thin-film transistors (TFTs) uses as switching elements.

The processing system 110 includes sensor circuitry 404 and a determination module 420. The sensor circuitry 404 operates electrodes to receive resulting signals therefrom. In embodiments, the sensor circuitry 404 operates the first electrodes 304 and the second electrode(s) 310 of the lighting elements 208 to receive resulting signals. In some embodiments, the sensor circuitry 404 can also operate other sensor electrodes 412 that may be disposed in other devices, such as the track pad 202. In some embodiments, the sensor circuitry includes components such as buck or boost converters to generate display voltages (e.g. 4-8 Volts) or regulating down higher voltages used for control logic (e.g., 3.3-1.2 Volts) The sensor circuitry 404 can operate the other sensor electrodes 412 in parallel to or in sequence with the first electrodes 304 and the second electrode(s) 310.

The determination module 420 is configured to determine capacitive measurements from the resulting signals. The determination module 420 can include processor circuitry 426, such as a digital signal processor (DSP), microprocessor, or the like. The determination module 420 can include memory 428 configured to store software and/or firmware configured for execution by the processor circuitry 426 to implement various functions, such as determining object position from the resulting signals. Alternatively, some or all of the functions of the determination module 420 can be implemented entirely in hardware (e.g., using integrated circuitry). The determination module 420 can track changes in capacitive measurements to detect input object(s). The processing system 110 can include other modular configurations, and the functions performed by the sensor circuitry 404 and the determination module 420 can, in general, be performed by one or more modules or circuits in the processing system 110. The processing system 110 can include other modules and circuits, and can perform other functions as described in some embodiments below.

In an embodiment, the sensor circuitry 404 includes a first electrode interface 414, a second electrode interface 416, and a controller 418. The first electrode interface 414 comprises circuitry coupled to the first electrodes 304 (in some embodiments through the switch circuitry 408). The second electrode interface 416 comprises circuitry coupled to the second electrode(s) 310 (in some embodiments through the switch circuitry 408). The controller 418 comprises circuitry coupled to the first electrode interface 414 and the second electrode interface 416. The sensor circuitry 404 can include other configurations and the functions performed by the first electrode interface 414, the second electrode interface 416, and the controller can, in general, by performed by other circuit configurations.

The processing system 110 can operate in absolute capacitive sensing mode or transcapacitive sensing mode. In absolute capacitive sensing mode, receiver(s) in the sensor circuitry 404 measure voltage, current, or charge on electrode(s) (e.g., the first electrodes 304 and/or the other sensor electrodes 412) while the electrode(s) are modulated with absolute capacitive sensing signals to generate the resulting signals. The determination module 420 generates absolute capacitive measurements from the resulting signals. The determination module 420 can track changes in absolute capacitive measurements to detect input object(s).

In transcapacitive sensing mode, transmitter(s) in the sensor circuitry 204 drive one or more electrodes with the capacitive sensing signal (also referred to as a transmitter signal or modulated signal in the transcapacitive sensing mode). Receiver(s) in the sensor circuitry 204 measure voltage, current, or charge on one or more other electrodes to generate the resulting signals. The resulting signals comprise the effects of the capacitive sensing signal and input object(s). The determination module 420 generates transcapacitive measurements from the resulting signals. The determination module 420 can track changes in transcapacitive measurements to detect input object(s).

Areas of localized capacitive coupling between electrodes (transcapacitance) or between electrodes and input object(s) (absolute capacitance) may be form "capacitive pixels" of a "capacitive image." The capacitive couplings change with the proximity and motion of input objects in the sensing region. In general, the localized capacitive couplings as measured by the receiver electrodes may be termed "capacitive measurements."

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region. For example, the processing system 110 can use successive capacitive images acquired over successive periods of time to track the motion(s) of one or more input objects entering, exiting, and within the sensing region.

In absolute capacitive sensing mode, the processing system 110 can use the resulting signals to determine capacitive measurements along one or more axes of the electrodes. The processing system 110 can acquire multiple capacitive measurements along the axes over multiple time periods and can determine differences between capacitive measurements to derive information about input in the sensing region.

The baseline capacitance of the input device is the capacitive image or capacitive profile acquired when no input object is in the sensing region. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region, and uses those baseline images or baseline profiles as estimates of baseline capacitances or filtering the baseline capacitances. In some embodiments, taking "baseline profiles" or "baseline images" if part of a start-up mode, test mode or a low power mode. The determination module 420 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In an embodiment, the processing system 110 comprises a single integrated controller, such as an application specific integrated circuit (ASIC), having the sensor circuitry 408, the determination module 420, and any other module(s) and/or circuit(s). In another embodiment, the processing system 110 can include a plurality of integrated circuits, where the sensor circuitry 408, the determination module 420, and any other module(s) and/or circuit(s) can be divided among the integrated circuits. For example, the sensor circuitry 408 can be on one integrated circuit, and the determination module 420 and any other module(s) and/circuit(s) can be one or more other integrated circuits.

Figure 5:
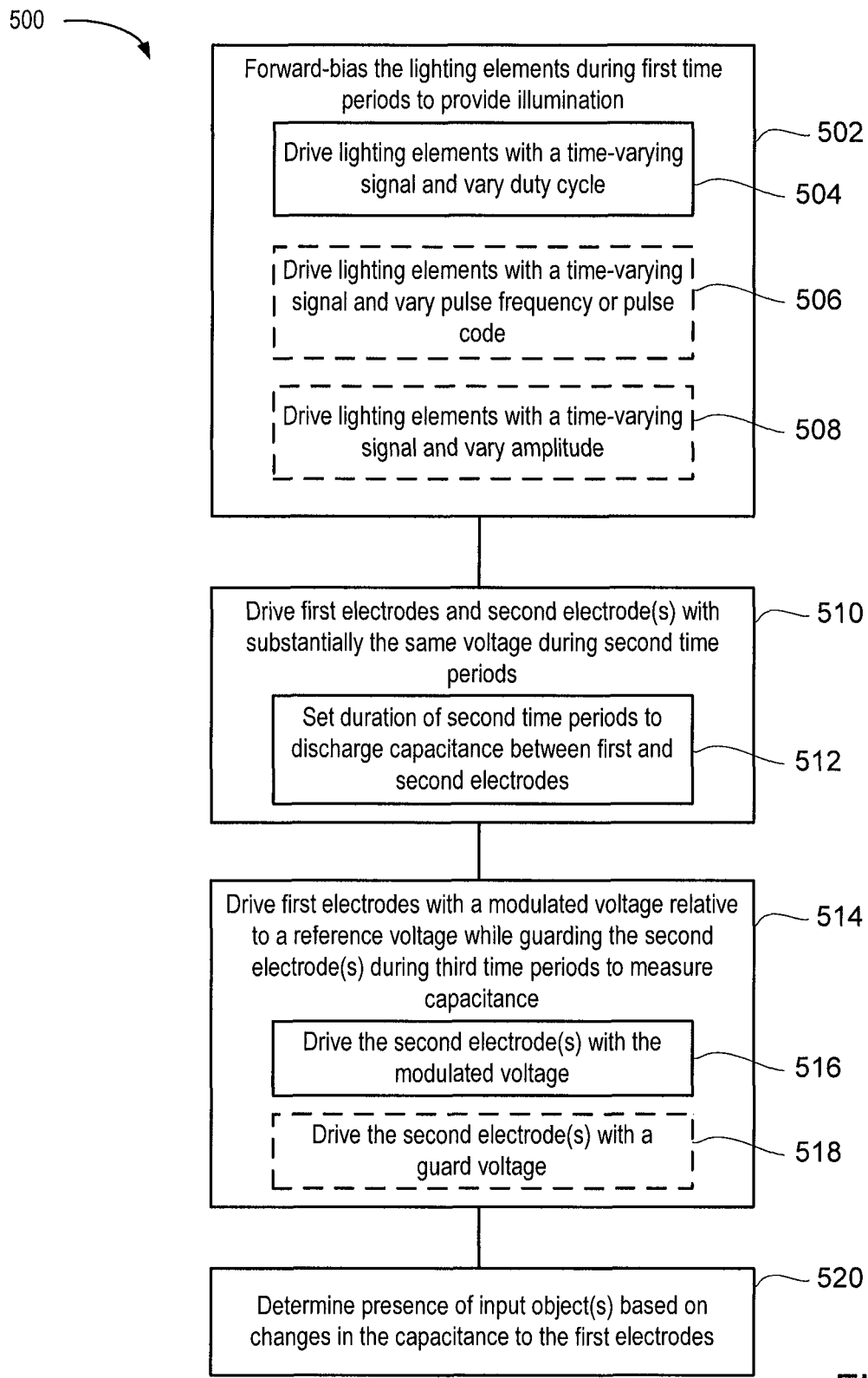
FIG. 5 is a flow diagram depicting a method of controlling lighting elements for illumination and capacitive sensing according to an embodiment.

FIG. 5 is a flow diagram depicting a method 500 of controlling the lighting elements 208 for illumination and capacitive sensing according to an embodiment. The method 500 can be performed by the processing system 110. The method 500 begins at step 502, where the controller 418 controls the first electrode interface 414 and the second electrode interface 416 to forward-bias the lighting elements 208 during first time periods to provide illumination. The sensor circuitry 404 forward-biases the lighting elements 208 by causing a voltage potential difference between the anode electrodes (e.g., first electrodes 304) and the cathode electrodes (e.g., the second electrode(s) 310) to exceed a threshold voltage.

In an embodiment, the sensor circuitry 404 varies the apparent brightness by varying the time the lighting elements 208 are on versus the time the lighting elements 208 are off during the first time periods. That is, at step 504, the controller 418 controls the first electrode interface 414 and the second electrode interface 416 to drive the lighting elements 208 with a time-varying signal having a variable duty cycle to control the apparent brightness of the illumination. In another embodiment, the sensor circuitry 404 varies the apparent brightness by varying the pulse frequency or pulse code of the time-varying signal (step 506). That is, the controller 418 can vary the frequency of pulses applied to the lighting elements 208 (pulse frequency modulation). Alternatively, the controller 418 can vary the width of pulses applied to the lighting elements 208 (pulse code modulation), for example, using a code which optimizes the high frequency component of On/Off transitions to minimize perception of that modulation to a user. In another embodiment, the controller 418 can vary the amplitude of the time-varying signal (e.g. current) applied to the lighting elements 208 (508). Those skilled in the art will appreciate that other techniques can be used to vary the apparent brightness of forward-biased lighting elements during the first time periods.

At step 510, the controller 418 controls the first electrode interface 414 and the second electrode interface 416 to drive the first and second electrodes 304, 310 with substantially the same voltage during second time periods. At step 512, the controller 418 sets the duration of the second time periods to discharge capacitance between the first and second electrodes 304, 310. Lighting elements, such as OLEDs, can have significant capacitance between anode and cathode. This capacitance and environmentally dependent stored charge will affect the measurements made during capacitive sensing to detect input object(s). Thus, the sensor circuitry 404 discharges this capacitance during the second time periods before performing capacitive sensing during third time periods.

At step 514, the controller 418 controls the first electrode interface 414 and the second electrode interface 416 to drive the first electrodes 304 with a modulated voltage relative to a reference voltage while guarding the second electrode(s) 310 during third time periods to measure capacitance (absolute capacitive measurements). In an embodiment, the sensor circuitry 408 guards the second electrode(s) 310 by driving the second electrode(s) 310 with the modulated voltage that is applied to the first electrodes 304 (516). In another embodiment, the sensor circuitry 408 guards the second electrode(s) 310 by driving the second electrode(s) 310 with a guard voltage (518). In yet another embodiment, the second electrode(s) 310 can be left floating during capacitive sensing at step 514.

At step 520, the determination module 420 determines presence of input object(s) based on changes in capacitance to the first electrodes 310 (e.g., changes in absolute capacitance). For example, the determination module 420 can receive the resulting signals from the sensor circuitry 408 obtained during the third time periods. The determination module 420 can process the resulting signals to determine the changes in capacitance. The determination module 420 can track changes in capacitance over time to track input object(s) in the sensing region.

Figure 6:
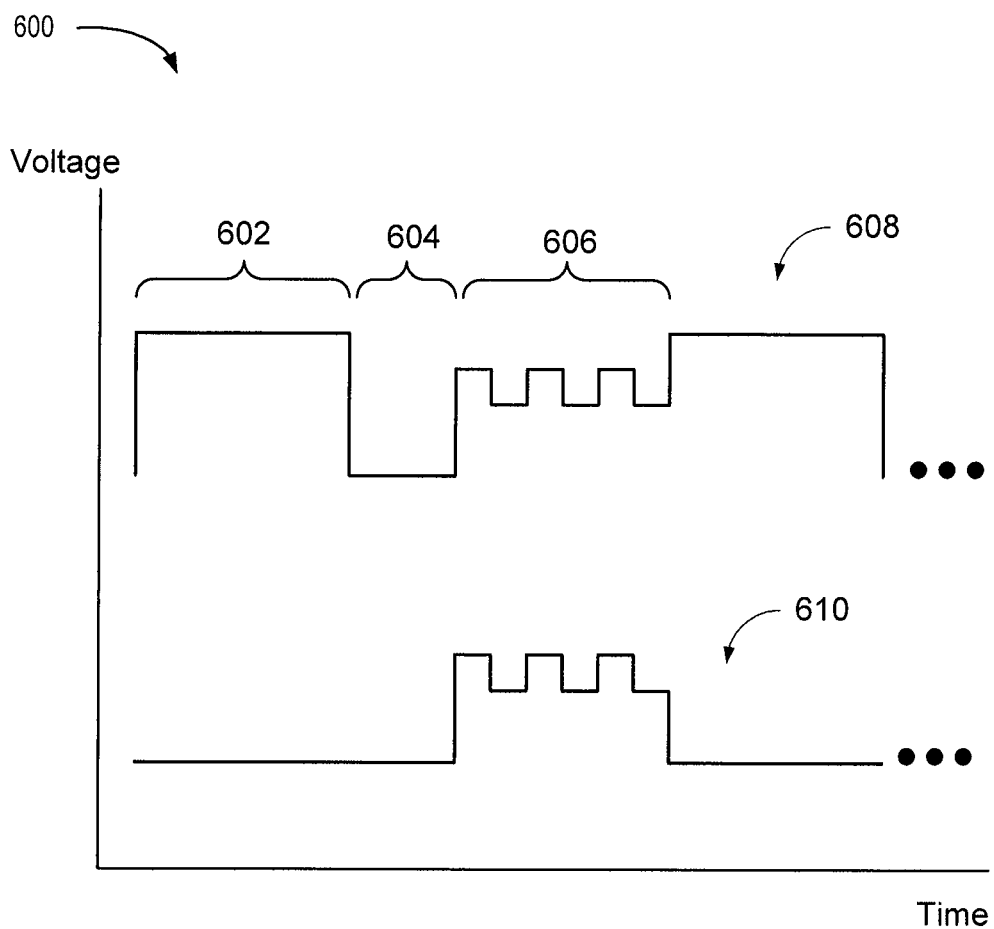
FIG. 6 illustrates a graph showing signals applied to a lighting element during first, second, and third time periods according to an embodiment.

FIG. 6 illustrates a graph 600 showing signals applied to a lighting element 208 during the first, second, and third time periods according to an embodiment. The graph 600 includes an x-axis representing time, and a y-axis representing voltage. In the example, a signal 608 represents voltage applied to the anode of the lighting element 208 (e.g., the first electrode 304) and a signal 610 represents voltage applied the cathode of the lighting elements 208 (e.g., the second electrode 310). During a first time period 602, the lighting element 208 is controlled for illumination. In the example, a voltage pulse is applied to the anode while the cathode remains at a reference voltage to turn the lighting element 208 on during the time period 602. Alternatively, the anode can be at the same potential as the cathode to turn off the lighting element. In other embodiments, as discussed above, a time-varying signal can be applied to the lighting element 208 to control the apparent brightness of the illumination.

A second time period 604 occurs after the first time period 602. During the second time period 604, the anode and the cathode of the lighting element 208 are driven to substantially the same voltage to discharge the capacitance of the lighting element 208. The duration of the second time period 604 can be much less than the duration of the first time period 602.

A third time period 606 occurs after the second time period 604. During the third time period 606, the sensor circuitry 408 drives the sensor electrode(s) with a modulated signal (e.g., a square wave, sine wave, triangle wave, etc.). In the example, the sensor circuitry 408 guards the cathode by applying the same modulated signal during the third time period 606. In other embodiments, the sensor circuitry 408 can apply a guard signal to the cathode during the third time period 606 or leave the cathode floating. The signals 608 and 610 repeat with successive repetitions of the first, second, and third time periods.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A processing system for a capacitive input device, comprising:
   a first interface coupled to at least one first electrode of at least one lighting element;
   a second interface coupled to at least one second electrode of the at least one lighting element spaced apart from the at least one first electrode;
   a controller, coupled to the first interface and the second interface, configured to:
   forward-bias the at least one lighting element during first time periods to provide illumination;
   discharge capacitance of the at least one lighting element between the at least one first electrode and the at least one second electrode during second time periods;
   drive the at least one first electrode with a modulated voltage relative to a reference voltage while guarding the at least one second electrode during third time periods; and receive at least one resulting signal from the at least one first electrode during the third time periods to measure absolute capacitance; and a determination module, coupled to the controller, configured to determine presence of at least one input object in a sensing region based on changes in the absolute capacitance of each of the at least one first electrode.

2. The processing system of claim 1, wherein the controller is configured to forward-bias the at least one lighting element with a time-varying signal, and wherein the controller is further configured to vary a duty cycle of the time-varying signal during the first time periods.

3. The processing system of claim 1, wherein the controller is configured to forward-bias the at least one lighting element with a time-varying signal, and wherein the controller is further configured to vary a pulse frequency or pulse code of the time-varying signal during the first time periods.

4. The processing system of claim 1, wherein the controller is configured to forward-bias the at least one lighting element with a time-varying signal, and wherein the controller is further configured to vary an amplitude of the time-varying signal during the first time periods.

5. The processing system of claim 1, wherein the third time periods are respectively subsequent to the second time periods.

6. The processing system of claim 1, wherein the controller is configured to guard the at least one second electrode during the third time periods by driving the at least one second electrode with the modulated voltage.

7. The processing system of claim 1, wherein the controller is configured to guard the at least one second electrode during the third time periods by driving the at least one second with a guard voltage.

8. A capacitive sensing system, comprising:
an input device including at least one lighting element having at least one first electrode spaced apart from at least one second electrode; and a processing system having a first interface coupled to the at least one first electrode and a second interface coupled to the at least one second electrode, the processing system including:

a controller, coupled to the first interface and the second interface, configured to:
forward-bias the at least one lighting element during first time periods to provide illumination;
discharge capacitance of the at least one lighting element between the at least one first electrode and the at least one second electrode during second time periods;
drive the at least one first electrode with a modulated voltage relative to a reference voltage while guarding the at least one second electrode during third time periods; and
receive at least one resulting signal from the at least one first electrode during the third time periods to measure absolute capacitance; and a determination module, coupled to the controller, configured to determine presence of at least one input object in a sensing region based on changes in the absolute capacitance of each of the at least one first electrode.

9. The system of claim 8, wherein the input device comprises a key in a keyboard.

10. The system of claim 9, wherein the at least one first electrode and the at least one second electrode are disposed on flexible substrates that conform to a profile of an input surface of the key.

11. The system of claim 8, wherein the input device comprises an input surface adjacent to a display.

12. The system of claim 8, wherein the processing system is coupled to the at least one first electrode and the at least one second electrode through a plurality of thin-film transistors (TFTs).

13. A method of controlling at least one lighting element for illumination and capacitive sensing, the at least one lighting element comprising at least one first electrode spaced apart from at least one second electrode, the method comprising:
forward-biasing the at least one lighting element during first time periods to provide illumination;
discharging capacitance of the at least one lighting element between the at least one first electrode and the at least one second electrode during second time periods;
driving the at least one first electrode with a modulated voltage relative to a reference voltage while guarding the at least one second electrode during third time periods;
receiving at least one resulting signal from the at least one first electrode during the third time periods to measure absolute capacitance; and
determining presence of at least one input object in a sensing region based on changes in the absolute capacitance of each of the at least one first electrode.

14. The method of claim 13, wherein the step of forward-biasing the at least one lighting element comprises:
driving the at least one lighting element with a time-varying signal; and
varying a duty cycle of the time-varying signal during the first time periods.

15. The method of claim 13, wherein the step of forward-biasing the at least one lighting element comprises:
driving the at least one lighting element with a time-varying signal; and
varying a pulse frequency or pulse code of the time-varying signal during the first time periods.

16. The method of claim 13, wherein the step of guarding the at least one second electrode during the third time periods comprises:
driving the at least one second electrode with the modulated voltage.

17. The method of claim 13, wherein the step of guarding the at least one second electrode during the third time periods comprises:
driving the at least one second electrode with a guard voltage.

\* \* \* \* \*

UNITED STATES PATENT AND TRADEMARK OFFICE
CERTIFICATE OF CORRECTION

PATENT NO.        : 9,933,906 B2
APPLICATION NO.   : 15/083192
DATED             : April 3, 2018
INVENTOR(S)       : Joseph Kurth Reynolds et al.

Page 1 of 1

It is certified that error appears in the above-identified patent and that said Letters Patent is hereby corrected as shown below:

Column 13, Line 35 In Claim 7, after "second" insert -- electrode --.

Signed and Sealed this
Twenty-first Day of August, 2018

Andrei Iancu
*Director of the United States Patent and Trademark Office*